United States Patent
Kawachiya et al.

(10) Patent No.: US 10,453,167 B1
(45) Date of Patent: Oct. 22, 2019

(54) ESTIMATING PERFORMANCE OF GPU APPLICATION FOR DIFFERENT GPU-LINK PERFORMANCE RATIO

(71) Applicant: INTERNATIONAL BUSINESS MACHINES CORPORATION, Armonk, NY (US)

(72) Inventors: Kiyokuni Kawachiya, Kanagawa (JP); Yasushi Negishi, Tokyo (JP); Jun Doi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/956,321

(22) Filed: Apr. 18, 2018

(51) Int. Cl.
*G06F 11/34* (2006.01)
*G06T 1/20* (2006.01)
*G06F 9/38* (2018.01)

(52) U.S. Cl.
CPC .............. *G06T 1/20* (2013.01); *G06F 9/3881* (2013.01); *G06F 11/3447* (2013.01); *G06F 11/3457* (2013.01)

(58) Field of Classification Search
None
See application file for complete search history.

(56) References Cited

U.S. PATENT DOCUMENTS

| | | | |
|---|---|---|---|
| 2006/0074970 A1* | 4/2006 | Narayanan | G06F 11/3419 |
| 2010/0153934 A1* | 6/2010 | Lachner | G06F 8/45 717/146 |
| 2011/0320391 A1 | 12/2011 | Chen et al. | |
| 2015/0100971 A1* | 4/2015 | Dube | G06F 9/4881 719/319 |
| 2017/0220942 A1 | 8/2017 | Baldini Soares et al. | |
| 2018/0344413 A1* | 12/2018 | Rappel | A61B 34/00 |

* cited by examiner

*Primary Examiner* — Joni Richer
(74) *Attorney, Agent, or Firm* — Tutunjian & Bitetto, P.C.; Vazken Alexanian

(57) ABSTRACT

A computer-implemented method is provided for estimating the performance of a GPU application on a new computing machine having an increased GPU-link performance ratio relative to a current computing machine having a current GPU-link performance ratio. The method includes adding a delay to CPU-GPU communication on the current computing machine to simulate a delayed-communication environment on the current computing machine. The method further includes executing the target GPU application in the delayed-communication environment. The method also includes measuring the performance of the target GPU application in the delayed-communication environment. The method additionally includes estimating the performance of the new computing machine having the increased higher GPU-link performance ratio, based on the measured performance of the target GPU application in the delayed-communication environment.

20 Claims, 8 Drawing Sheets

```
hookedCudaMemcpy(dst, src, count, kind) {
    cudaMemcpy(dst, src, count, kind);      // 1
    cudaMemcpy(dst, src, count/5, kind);    // 0.2
}
```

FIG. 6

ESTIMATING PERFORMANCE OF GPU APPLICATION FOR DIFFERENT GPU-LINK PERFORMANCE RATIO

BACKGROUND

Technical Field

The present invention relates generally to information processing and, in particular, to estimating the performance of a Graphical Processing Unit (GPU) application for a different GPU-link performance ratio.

Description of the Related Art

Currently, a supercomputer node often includes a CPU and a GPU. On such computing machines, application execution mainly involves "GPU computation" and "CPU-GPU communication". That is, before executing a kernel on a GPU, the data used by the kernel has to be transferred from CPU memory to GPU memory. After execution, the data produced by the kernel on the GPU is typically transferred back to the CPU memory. In the preceding scenario, the execution relates to "GPU computation", while the transferring of data relates to "CPU-GPU communication"

Performance estimation for future computing machines, especially for machines with faster GPUs, is very important both for application tuning and for sales. However, the new machine usually has a different CPU-link performance ratio. Therefore, even if a new computing machine has a 1.5× faster GPU, an application executed on that machine may not be 1.5× accelerated. As mentioned above, application execution also depends on the CPU-GPU communication, which is usually less improved than GPU performance such as, for example, 1.25×.

Currently, performance estimation in such a situation needs information about how GPU computation and CPU-GPU communication depend on each other in the target GPU application, which is not so easy to obtain and determine. Hence, there is a need for a way to estimate the performance of GPU applications for a different GPU-link performance ratio, particularly for cases where the internal structure of the target GPU application is unknown.

SUMMARY

According to an aspect of the present invention, a computer-implemented method is provided for estimating the performance of a GPU application on a new computing machine having an increased GPU-link performance ratio relative to a current computing machine having a current GPU-link performance ratio. The method includes adding a delay to CPU-GPU communication on the current computing machine to simulate a delayed-communication environment on the current computing machine. The method further includes executing the target GPU application in the delayed-communication environment. The method also includes measuring the performance of the target GPU application in the delayed-communication environment. The method additionally includes estimating the performance of the new computing machine having the increased higher GPU-link performance ratio, based on the measured performance of the target GPU application in the delayed-communication environment.

According to another aspect of the present invention, a computer program product is provided for estimating the performance of a GPU application on a new computing machine having an increased GPU-link performance ratio relative to a current computing machine having a current GPU-link performance ratio. The computer program product includes a non-transitory computer readable storage medium having program instructions embodied therewith. The program instructions are executable by the current computing machine to cause the current computing machine to perform a method. The method includes adding a delay to CPU-GPU communication on the current computing machine to simulate a delayed-communication environment on the current computing machine. The method further includes executing the target GPU application in the delayed-communication environment. The method also includes measuring the performance of the target GPU application in the delayed-communication environment. The method additionally includes estimating the performance of the new computing machine having the increased higher GPU-link performance ratio, based on the measured performance of the target GPU application in the delayed-communication environment.

According to yet another aspect of the present invention, a computer processing system is provided. The computer processing system includes a current computing node having a current GPU-link performance ratio and being configured to estimate a performance of a GPU application on a new computing machine having an increased GPU-link performance ratio relative to the current computing machine by adding a delay to CPU-GPU communication on the current computing machine to simulate a delayed-communication environment on the current computing machine, executing the target GPU application in the delayed-communication environment, measuring the performance of the target GPU application in the delayed-communication environment, and estimating the performance of the new computing machine having the increased higher GPU-link performance ratio, based on the measured performance of the target GPU application in the delayed-communication environment.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 shows an exemplary hooking of the cudaMemcpy function, in accordance with an embodiment of the present invention;

DETAILED DESCRIPTION

The present invention is directed to estimating the performance of a Graphical Processing Unit (GPU) application for a different GPU-link performance ratio. The present invention can be used to estimate the performance of one or more GPU applications for one or more different GPU-link performance ratios.

As used herein, the term "GPU-link performance ratio" relates to the performance of GPU execution versus the performance of CPU-GPU communication link. Hence, for increasing GPU-link performance, the GPU execution performance increases relative to the CPU-GPU communication. In contrast, for decreasing GPU-link performance, the GPU performance decreases relative to the CPU-GPU communication.

Moreover, as used herein, the term "CPU-GPU communication" can refer to any of a communication from the CPU to the GPU and/or from the GPU to the CPU.

In an embodiment, the present invention can estimate the performance of a target GPU application for a higher GPU-link performance ratio, without knowing the internal structure of a target GPU application.

Before executing a kernel on a GPU, the data used by the kernel has to be transferred from CPU memory to GPU memory. After execution, the data produced by the kernel on the GPU is typically transferred back to the CPU memory. Such transfers of data from (CPU memory to GPU memory and GPU memory to CPU memory) can involve a memory transferring function such, for example, but not limited to, cudaMemcpy and any of its variants.

Hence, in an embodiment, CPU-GPU communication can be performed using the CUDA library function cudaMemcpy (and/or any of its variants). In an embodiment, the function is modified to add a delay to the CPU-GPU communication to simulate the situation where the GPU-link performance ratio increases (i.e., the link becomes relatively slower than the GPU). In an embodiment, one exemplary way to add the delay is to perform a data transfer multiple times (e.g., 1.2 times). However, as is readily appreciated by one of ordinary skill in the art, other functions can also be used to implement the present invention, while maintaining the spirit of the present invention.

In an embodiment, in a CPU-GPU communication function(s), the processing is intentionally delayed by adding wait in the function(s), sending a larger size (amount) of data, or sending the data (or a part thereof) multiple times. The invocation overhead of the communication function can also be taken into account by measuring the overhead at initialization time.

In an embodiment, the target application can be executed in this delayed-communication environment, and the measured result can be used to estimate the performance on a new machine which has a higher GPU-link performance ratio.

Figure 1:
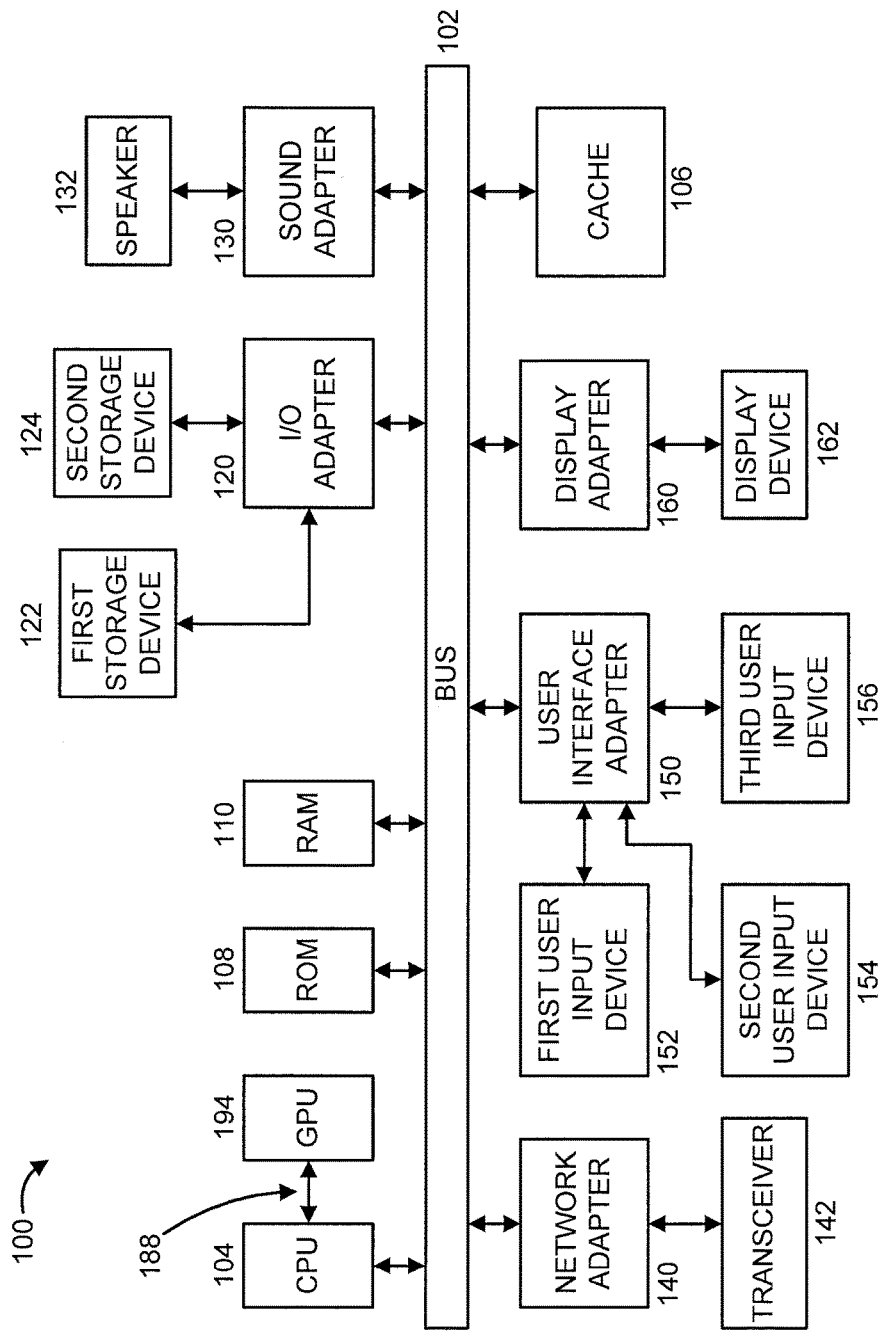
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

At least one Graphics Processing Unit (GPU) 194 is included in system 100. CPU 104 and GPU 194 are directly connected to each other by CPU-GPU communication link 188.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
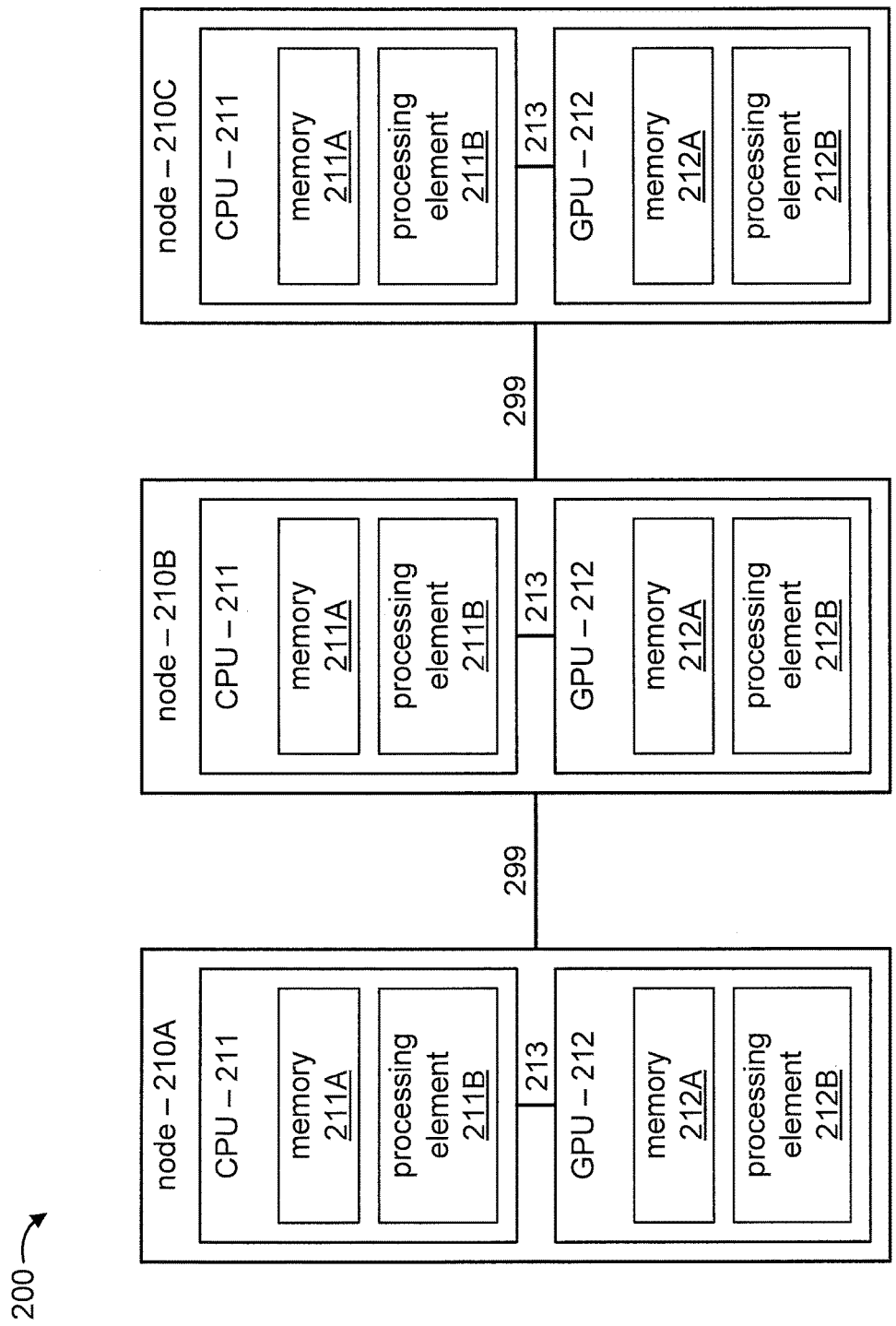
FIG. 2 is a block diagram showing another exemplary processing system to which the present invention may be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
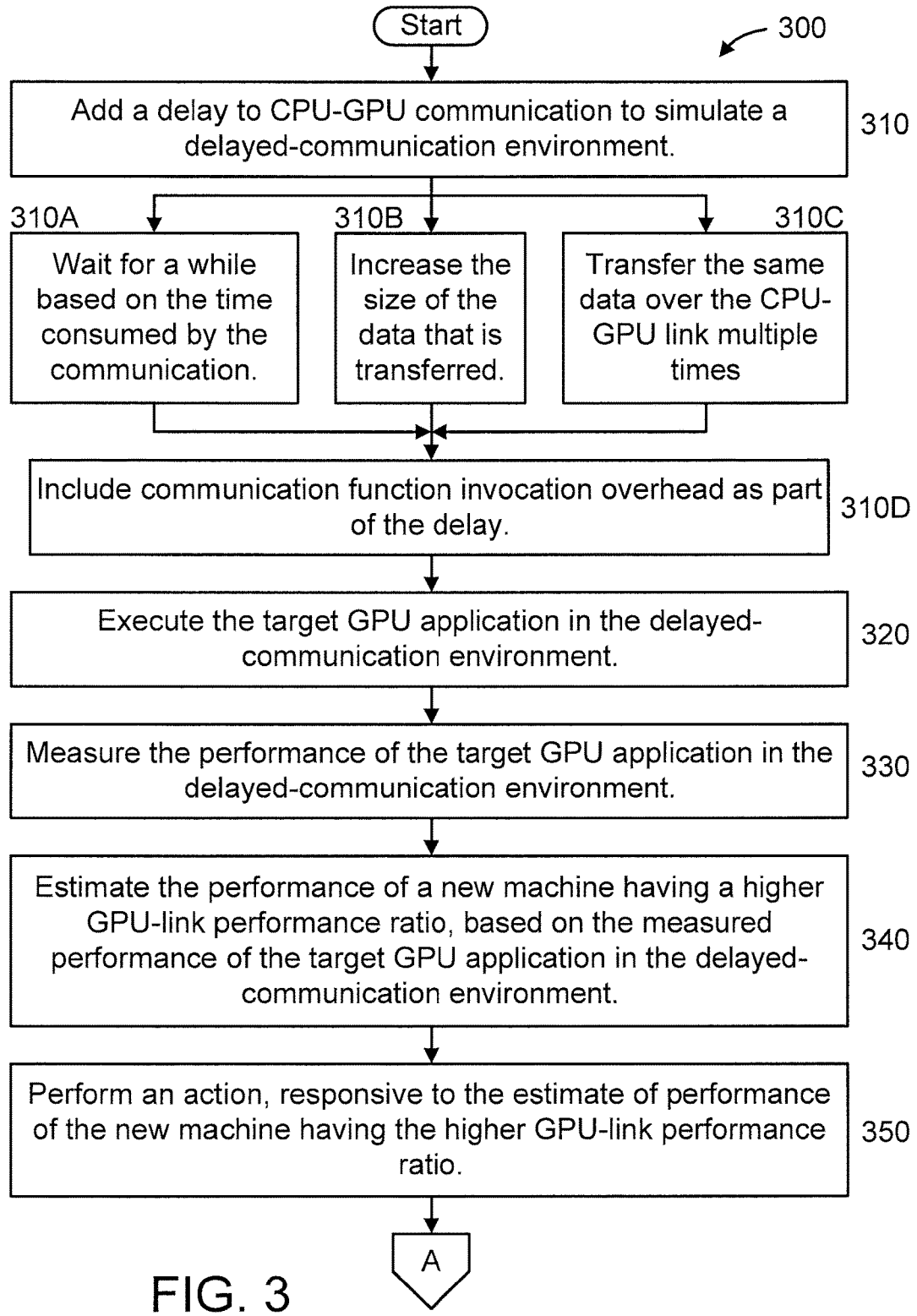
FIGS. 3-4 are flow diagrams showing an exemplary method for estimating the performance of a GPU application for a different GPU-link performance ratio, in accordance with an embodiment of the present invention.
Figure 4:
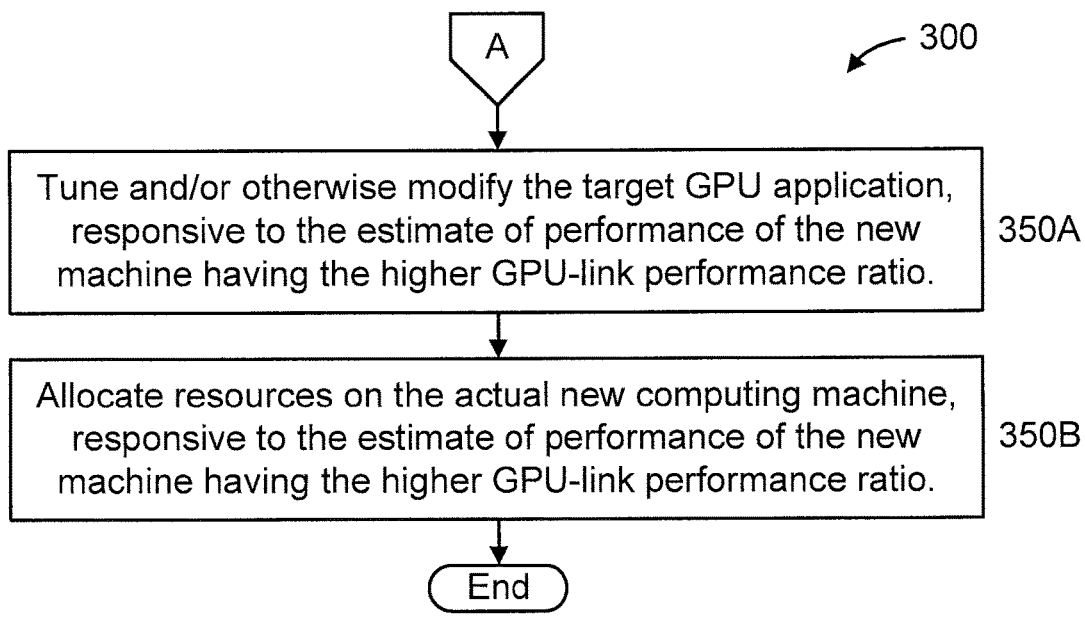
Figure 5:
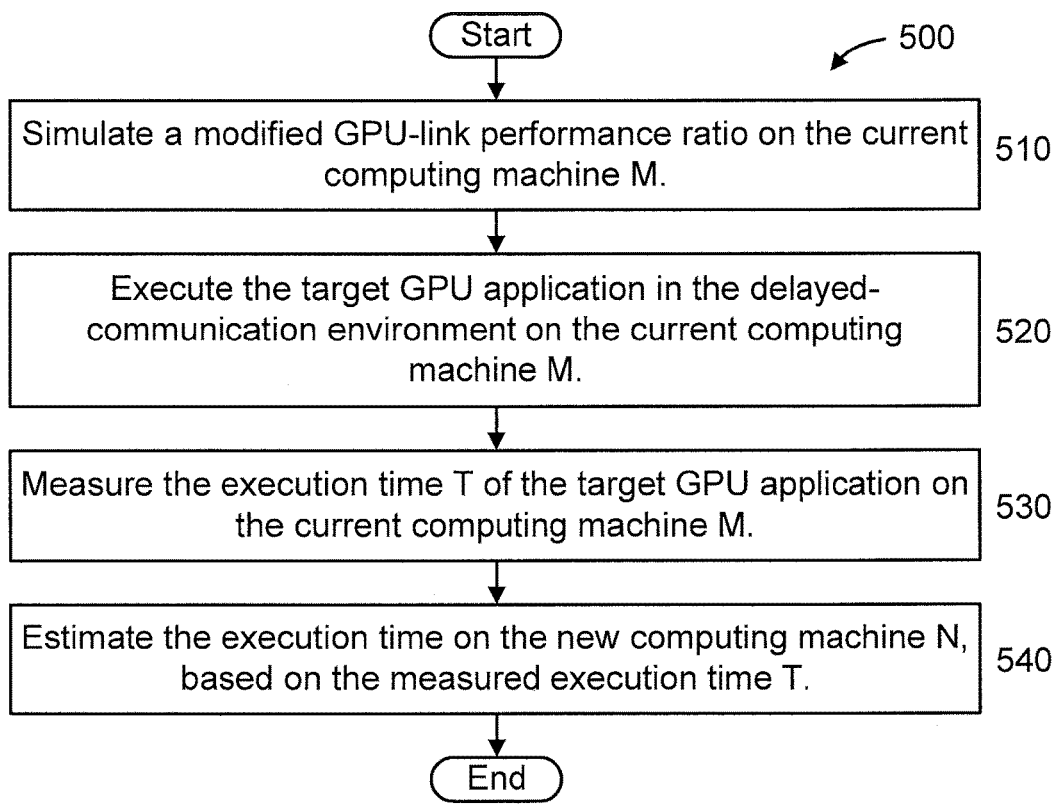
FIG. 5 is a flow diagram showing an exemplary method for estimating the performance of a GPU application on a new computing machine N having a different GPU-link performance ratio relative to a current computing machine M having a current GPU-link performance ratio, in accordance with an embodiment of the present invention.

Further, it is to be appreciated that processing system 100 may perform at least part of the method described herein including, for example, at least part of method 300 of FIGS. 3-4 and/or at least part of method 500 of FIG. 5. Similarly, part or all of system 200 may be used to perform at least part of method 300 of FIGS. 3-4 and/or at least part of method 500 of FIG. 5.

FIG. 2 is a block diagram showing another exemplary processing system 200 to which the present invention may be applied, in accordance with an embodiment of the present invention. Processing system 200 can represent at least part of a server, a supercomputer, and so forth.

The processing system 200 includes multiple nodes 210A-C. The nodes 210A-C are interconnected by network 299. Each of the nodes 210A-C includes a CPU 211 and a GPU 212 connected thereto via a CPU-GPU communication link 213. The CPU 211 (of each node) includes a CPU memory 211A and a CPU processing element 211B. The GPU 212 (of each node) includes a GPU memory 212A and a GPU processing element 212B.

In system 200, data is transferred from the CPU memory 211A to the GPU memory 212A for execution by the GPU processing element 212B. The result of the execution is then transferred from the GPU memory 212A to the CPU memory 211A. The transferring of data from the CPU memory 211A to the GPU memory 212A and/or from the GPU memory 212A to the CPU memory 211A can be considered "CPU-GPU communication". The execution of data by the GPU processing element 212B can be considered "GPU computation".

In the embodiments shown in FIGS. 1 and 2, the elements thereof are interconnected by a bus (e.g., bus 102 in FIG. 1), a communication link (e.g., communication link 213 in FIG. 2), or network (e.g., network 299 in FIG. 2). However, in other embodiments, other types of connections can also be used. Moreover, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of system 100 and/or system 200 (e.g., nodes 210A-C) can be implemented in a cloud configuration including, for example, in a distributed configuration. Additionally, one or more elements in system 100 and/or system 200 can be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 100 and system 200 are readily determined by one of ordinary skill in the art, given the teachings of the present invention provided herein, while maintaining the spirit of the present invention.

FIGS. 3-4 are flow diagrams showing an exemplary method 300 for estimating the performance of a GPU application for a different GPU-link performance ratio, in accordance with an embodiment of the present invention. The method 300 can be applied relative to a current computing machine and a new computing machine, where a simulation on the current computing machine is used to estimate the performance of the new computing machine.

At block 310, add a delay to CPU-GPU communication to simulate a delayed-communication environment (on the current computing machine). The simulation of the delayed-communication environment on the current computing machine is intended to represent the functionality of the new computing machine with a different GPU-link performance ratio. The delayed-communication environment can correspond to (that is, represent) the case where the new computing machine has a GPU-link performance ratio increase relative to a current computing machine. The delayed-communication environment can correspond to the exemplary case where the CPU-GPU link is slower or can correspond to the exemplary case where the GPU computation is A times faster and the CPU-GPU communication is B times faster, where $A>=B$. As is evident, in both of the preceding exemplary cases, the CPU-GPU communication lags the GPU computation.

In an embodiment, the delay can be added by modifying a GPU library communication function. For the purposes of the present invention, the term "GPU library communication function" refers to a function that can be used to impart and/or otherwise cause a delay on CPU-GPU communication. In an embodiment, the GPU library communication function can be cudaMemcpy and/or any of its variants.

In an embodiment, block 310 can include one or more of blocks 310A, 310B, 310C, and 310D.

At block 310A, wait for a while based on the time consumed by the communication.

At block 310B, increase the size of the data that is transferred (e.g., using the function). In an embodiment, the parameter count of cudaMemcpy can be used to adjust the size of the data, as the same denotes the size in bytes of the data to be copied. However, an additional communication buffer must be prepared to receive the longer data.

At block 310C, transfer the same data over the CPU-GPU link multiple (e.g., 1.2) times (in order to add the delay). As used herein regarding adding the delay, the "same data" can refer to the same (entire) data result or the same portion of a data result. Such transfer can be achieved using "hooking" (see, e.g., FIGS. 4 and 5) or other techniques, as readily appreciated by one of ordinary skill in the art given the teachings of the present invention provided herein.

At block 310D, include communication function invocation overhead as part of the delay. The communication function (cudaMemcpy) invocation overhead can be measured, for example, at initialization time.

It is to be appreciated that block 310D can be performed with any of blocks 310A through C.

At block 320, execute the target GPU application in the delayed-communication environment.

At block 330, measure the performance of the target GPU application in the delayed-communication environment.

At block 340, estimate the performance of a new machine having a higher GPU-link performance ratio, based on the measured performance of the target GPU application in the delayed-communication environment.

At block 350, perform an action, responsive to the estimate of performance of the new machine having the higher GPU-link performance ratio.

In an embodiment, block 350 can include one or more of blocks 350A-B.

At block 350A, tune and/or otherwise modify the target GPU application, responsive to the estimate of performance of the new machine having the higher GPU-link performance ratio. The tuning/modification can be performed to fully exploit the higher GPU-link performance ratio.

At block 350B, allocate resources on the actual new computing machine, responsive to the estimate of performance of the new machine having the higher GPU-link performance ratio. The resource allocation can be performed to optimize the use of such resources based on the estimate so as to maximize computer performance.

While block 350 and its sub-blocks mention several exemplary actions that can be performed responsive to the performance estimate of the new machine having the higher GPU-link performance ratio, it is to be appreciated that the present invention is not limited to the same and, thus, other actions can also be performed, as readily appreciate by one of ordinary skill in the art given the teachings of the present invention provided herein, while maintaining the spirit of the present invention.

Further referring to cudaMemcpy, as is known, cudaMemcpy can involve the following parameters:
dst—destination memory address;
src—source memory address;
count—size in bytes to copy; and
kind—type of transfer.

The parameters can be adjusted for the purposes of the present invention. For example, as noted above, the parameter count can be adjusted to add the aforementioned delay in block 310B of method 300.

A description will now be given of an example of estimating the performance on a new machine N relative to a current machine M, in accordance with an embodiment of the present invention. The description will be provided relative to FIGS. 5 and 6.

FIG. 5 is a flow diagram showing an exemplary method 500 for estimating the performance of a GPU application on a new computing machine N having a different GPU-link performance ratio relative to a current computing machine M having a current GPU-link performance ratio, in accordance with an embodiment of the present invention.

Regarding the new computing machine N, the GPU is 1.5× and CPU-GPU Link is 1.25× faster than the current computing machine M.

On the new computing machine N, GPU-link performance ratio increases 1.2× (=1.5/1.25) from computing machine M, which can be simulated by delaying the CPU-GPU data transfer by 1.2×. Using the method 310C, this can be done by transferring 20% of the data again by hooking the cudaMemcpy function. FIG. 6 shows an exemplary hooking 600 of the cudaMemcpy function, in accordance with an embodiment of the present invention.

At block 510, simulate a modified GPU-link performance ratio on the current computing machine M. For the sake of illustration, the following example will involve a GPU-link performance ratio increase and the use of hooking. However, it is to be appreciated that other embodiments can involve different techniques other than hooking in order to modify the operation of the involved function (in this case cudaMemcpy) to add delay to the CPU-GPU communication.

At block 520, execute the target GPU application in the delayed-communication environment on the current computing machine M.

At block 530, measure the execution time T of the target GPU application on the current computing machine M.

At block 540, estimate the execution time on the new computing machine N, based on the measured execution time T. The execution time on the new machine N can be estimated as T/1.5, since the GPU performance is 1.5×.

A description will now be given regarding the effectiveness of the present invention.

The present invention enables estimating the performance of GPU applications on a new/future machine which has a faster GPU, without knowing the internal structure of each application.

The preset invention is also applicable to estimate the performance of a machine which has the same GPU but a slower CPU-GPU Link.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
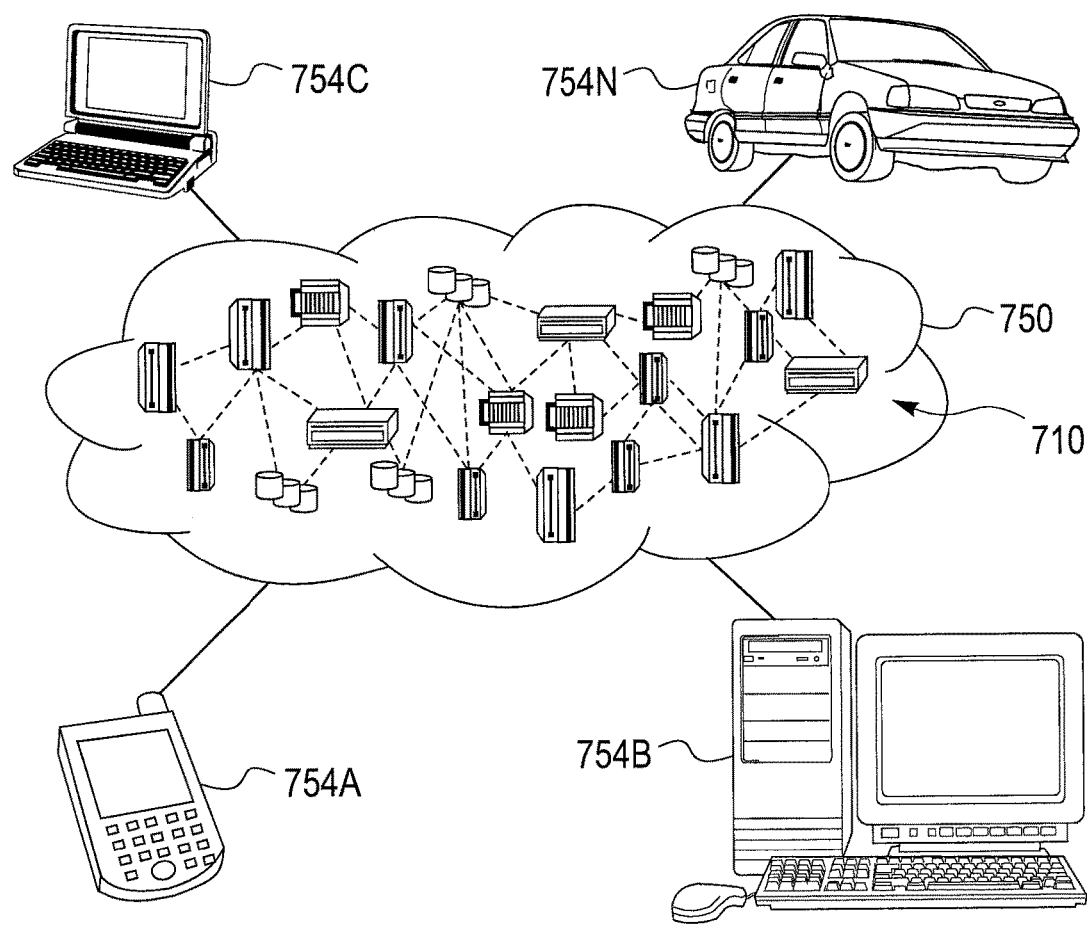
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
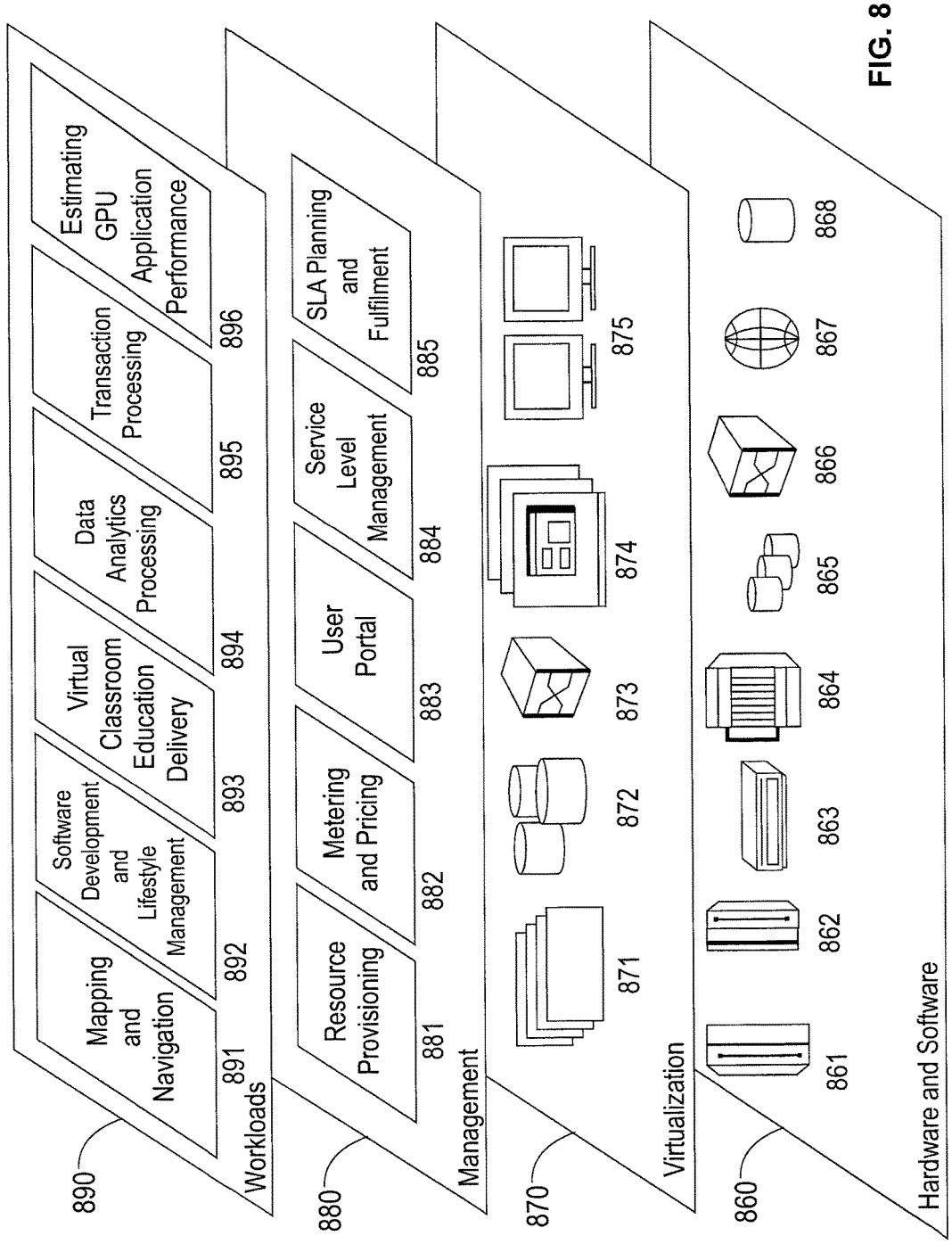
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and estimating GPU application performance for different GPU-link performance ratios 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for estimating the performance of a Graphics Processing unit (GPU) application on a new computing machine having an increased GPU-link performance ratio relative to a current computing machine having a current GPU-link performance ratio, the method comprising:
- adding a delay to Central Processing Unit (CPU)-GPU communication on the current computing machine to simulate a delayed-communication environment on the current computing machine;
- executing the target GPU application in the delayed-communication environment;
- measuring the performance of the target GPU application in the delayed-communication environment; and
- estimating the performance of the new computing machine having the increased higher GPU-link performance ratio, based on the measured performance of the target GPU application in the delayed-communication environment.

2. The computer-implemented method of claim 1, wherein said adding step comprises modifying a GPU library communication function to cause the delay.

3. The computer-implemented method of claim 2, wherein the GPU library communication function is a function capable of causing the delay to the CPU-GPU communication.

4. The computer-implemented method of claim 2, wherein the delay comprises an invocation overhead of the GPU library communication function.

5. The computer-implemented method of claim 2, wherein the delay is added by hooking the GPU library communication function.

6. The computer-implemented method of claim 1, wherein said adding step comprises waiting for a time duration based on a time period consumed by the CPU-GPU communication.

7. The computer-implemented method of claim 1, wherein said adding step comprises increasing a size of data that is transferred.

8. The computer-implemented method of claim 1, wherein said adding step comprises transferring a same data over a Central Processing Unit-Graphics Processing Unit (CPU-GPU) link multiple times.

9. The computer-implemented method of claim 1, wherein the method is provided as a cloud service.

10. A computer program product for estimating the performance of a Graphics Processing Unit (GPU) application on a new computing machine having an increased GPU-link performance ratio relative to a current computing machine having a current GPU-link performance ratio, the computer program product comprising a non-transitory computer readable storage medium having program instructions embodied therewith, the program instructions executable by the current computing machine to cause the current computing machine to perform a method comprising:
- adding a delay to Central Processing Unit (CPU)-GPU communication on the current computing machine to simulate a delayed-communication environment on the current computing machine;
- executing the target GPU application in the delayed-communication environment;
- measuring the performance of the target GPU application in the delayed-communication environment; and
- estimating the performance of the new computing machine having the increased higher GPU-link performance ratio, based on the measured performance of the target GPU application in the delayed-communication environment.

11. The computer program product of claim 10, wherein said adding step comprises modifying a GPU library communication function to cause the delay.

12. The computer program product of claim 11, wherein the GPU library communication function is a function capable of causing the delay to the CPU-GPU communication.

13. The computer program product of claim 11, wherein the delay comprises an invocation overhead of the GPU library communication function.

14. The computer program product of claim 11, wherein the delay is added by hooking the GPU library communication function.

15. The computer program product of claim 10, wherein said adding step comprises waiting for a time duration based on a time period consumed by the CPU-GPU communication.

16. The computer program product of claim 10, wherein said adding step comprises increasing a size of data that is transferred.

17. The computer program product of claim 10, wherein said adding step comprises transferring a same data over a Central Processing Unit-Graphics Processing Unit (CPU-GPU) link multiple times.

18. The computer program product of claim 10, wherein the method is provided as a cloud service.

19. A computer processing system, comprising:
- a current computing node having a current Graphics Processing Unit (GPU)-link performance ratio and being configured to estimate a performance of a GPU application on a new computing machine having an increased GPU-link performance ratio relative to the current computing machine by
  - adding a delay to Central Processing Unit (CPU)-GPU communication on the current computing machine to simulate a delayed-communication environment on the current computing machine;
  - executing the target GPU application in the delayed-communication environment;
  - measuring the performance of the target GPU application in the delayed-communication environment; and
  - estimating the performance of the new computing machine having the increased higher GPU-link performance ratio, based on the measured performance of the target GPU application in the delayed-communication environment.

20. The computer processing system of claim 19, wherein the current computing node adds the delay to the CPU-GPU communication by modifying a GPU library communication function to cause the delay.

* * * * *